United States Patent [19]

Kaiser

[11] Patent Number: 5,623,520
[45] Date of Patent: Apr. 22, 1997

[54] CORRELATION DETECTOR EMPLOYING TWO LEVEL A/D CONVERSION AND ARITHMETIC SIGN CONTROL

[75] Inventor: Stephen G. Kaiser, Hoffman Estates, Ill.

[73] Assignee: Northrop Grumman Corporation, Los Angeles, Calif.

[21] Appl. No.: 563,555

[22] Filed: Nov. 28, 1995

Related U.S. Application Data

[63] Continuation of Ser. No. 263,102, Jun. 21, 1994, abandoned.

[51] Int. Cl.$^6$ ............................................. H04L 13/18
[52] U.S. Cl. ..................... 375/343; 375/340; 364/728.03
[58] Field of Search .................................. 375/343, 318, 375/328, 349, 351, 340, 346, 348, 322, 324, 261, 281, 285, 235; 329/304, 306, 345, 346, 358; 364/724.03, 728.03; 370/18, 107

[56] References Cited

U.S. PATENT DOCUMENTS

| | | | |
|---|---|---|---|
| 3,495,032 | 2/1970 | Smith | 178/6 |
| 3,604,911 | 9/1971 | Schmitt | 364/728.03 |
| 3,696,414 | 10/1972 | Allen et al. | 343/5 R |
| 3,772,699 | 11/1973 | Romrell | 343/17.1 |
| 3,849,595 | 11/1974 | Ishiguro | 178/6 |
| 3,902,008 | 8/1975 | Ogawa | 178/6 |
| 3,961,172 | 6/1976 | Hutcheon | 235/181 |
| 4,011,561 | 3/1977 | Dounce | 343/4 DP |
| 4,020,283 | 4/1977 | Epstein | 178/88 |
| 4,037,151 | 7/1977 | Takeuchi | 324/78 R |
| 4,038,540 | 7/1977 | Roberts | 364/724.09 |
| 4,100,378 | 7/1978 | Claasen et al. | 178/84 |
| 4,107,610 | 8/1978 | Weber | 325/38 R |
| 4,203,071 | 5/1980 | Bowles et al. | 375/343 |
| 4,719,466 | 1/1988 | Farina et al. | 342/159 |
| 4,813,006 | 3/1989 | Burns et al. | 364/604 |
| 4,821,294 | 4/1989 | Thomas, Jr. | 375/343 |
| 4,973,969 | 11/1990 | Jenson | 342/189 |
| 5,081,461 | 1/1992 | Lowenschuss | 342/189 |
| 5,134,402 | 7/1992 | Miyoshi | 341/144 |
| 5,142,288 | 8/1992 | Cleveland | 342/45 |
| 5,184,135 | 2/1993 | Paradise | 342/149 |
| 5,189,428 | 2/1993 | Bouvet et al. | 342/132 |
| 5,194,870 | 3/1993 | Pearce et al. | 342/128 |
| 5,444,736 | 8/1995 | Kawashima et al. | 375/219 |

OTHER PUBLICATIONS

J. Van Trees, "Detection, Estimation, and Modulation Theory", Random Phase Angles, John Wiley and Sons, Inc., pp. 3335–3341.

G. Cooper et al., "Probabilisitc Methods of Signal and System Analysis", Systems That Maximize Signal-To-Noise Ratio, Optimum Linear Systems, pp. 205–210.

*Primary Examiner*—Wellington Chin
*Assistant Examiner*—William Luther
*Attorney, Agent, or Firm*—Terry J. Anderson; Karl J. Hoch, Jr.

[57] ABSTRACT

A correlation detector, in which an input signal is applied to a first path and a second path. The correlation detector includes an arithmetic sign control device applied to the first path and the second path, replacing the more traditional digital multipliers. Additionally, a comparator is used in the present invention which replaces the more traditional A/D converters.

6 Claims, 4 Drawing Sheets

CORRELATION DETECTOR EMPLOYING TWO LEVEL A/D CONVERSION AND ARITHMETIC SIGN CONTROL

GOVERNMENT LICENSE RIGHTS

The U.S. Government has a paid-up license in this invention and the right in limited circumstances to require the patent owner to license others on reasonable terms as provided for by the terms of contract MDA904-89-C-3063 awarded by the United States Army.

This application is a continuation of application Ser. No. 08/263,102 filed on Jun. 21, 1994, now abandoned.

BACKGROUND OF THE INVENTION

1. Field of the Invention

The present invention relates to correlation detectors, and more particularly to correlation detectors which utilize arithmetic sign control portions to economically operate.

2. Background Information

Correlation detectors (which are mathematically equivalent to, and in this disclosure will be considered as identical to, matched filters) are often used to detect sinusoidal signals under low signal-to-noise-ratio (hereafter referred to as "SNR") conditions. Such a prior art detection scheme is shown in FIG. 1 which is similar to that which is illustrated in page 340 of *Detection, Estimation, and Modulation Theory*, H. L. Van Trees, John Wiley and Sons, 1968. A noisy input signal is digitized by the analog-to-digital (hereafter referred to as "A/D") converter and into an output signal which is routed to an in-phase correlation portion and a quadrature correlation portion. Each correlation portion multiplies a noisy signal with the complex reference signal and integrates the result. (The complex reference signal is a cosine and sine wave at the signal's frequency). The two integrated products are then squared, summed together and compared to a threshold. If a threshold is exceeded, detection is indicated.

In practice, the above detection technique works quite well. However, high speed A/D converters are usually expensive, large and power hungry. Also, the correlation portions utilize digital multipliers which are power hungry when operated at high speeds, are relatively expensive and require significant processing time. The present invention relates to a technique that performs the above correlation/detection operation without the need for an A/D converter or digital multipliers. It produces results comparable to the correlation detector with only a slight loss (−3.5 dB) of detection sensitivity. This loss of sensitivity is more than offset by the advantages of less hardware, lower power consumption and lower costs.

SUMMARY OF THE INVENTION

The foregoing and other problems are overcome and the objects of the invention are realized by a correlation detector, in which an input signal is applied to a first path and a second path. The correlation detector includes an arithmetic sign control device applied to each of the first path and the second path and/or a hard limiter/comparator.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
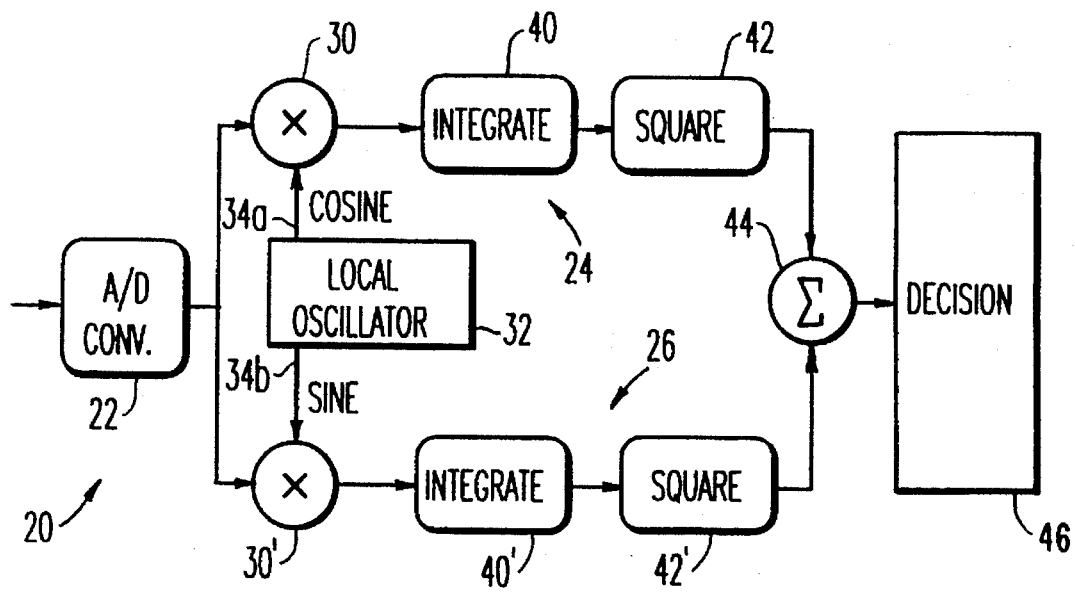
FIG. 1 is block diagram of a correlation detector of the prior art.

In this disclosure, similar reference characters may be provided for elements which exhibit similar functions in the different embodiments.

FIG. 1 illustrates a prior art correlation detector 20 of the type illustrated in the article *Detection, Estimation, and Modulation Theory*, H. L. Van Trees, John Wiley and Sons, Inc., NY., 1968 (Incorporated herein by reference). In this specification, the term "correlation detector" will be considered as synonymous with "matched filter". Correlation detectors are most commonly used in radar environments, but may also be used in any communication signalling device such as a computer modem, etc. The correlation detector 20 includes an analog-to-digital converter 22 (hereafter referred to as an A/D converter) which converts an analog signal into a coded digital signal. The output of the A/D converter 22 is electrically applied to a first path 24 and a second path 26. The first path 24 and the second path 26 in the FIGS. 1 and 2 embodiments have identical elements, and so the distinct element in the first path 24 will be provided without a prime suffix, while those in the second path 26 will be provided with a primed suffix. As such, the disclosure will only describe those elements relating to the first path 24, and the elements associated with the second path will be considered identical except where a specific distinction is made. In the FIG. 1 embodiment, the first path is considered to be an in-phase correlation portion, while the second path is a quadrature correlation portion.

The first path includes a digital multiplier 30. An example of a digital multiplier which could be used in the present disclosure is one produced by Integrated Devices Technology under the model name IDT-7216 (Integrated Devices Technology is a trademark of Integrated Devices Technology). A local oscillator 32 outputs a cosine output 34a to a digital multiplier 30 of the first path 24; and the local oscillator 32 outputs a sine output 34b which is in electrical communication with the digital multiplier 30' of the second path 26. The local oscillator in the FIG. 1 embodiment is typically a direct digital input type device (such as an EEPROM) which is capable of providing two output signals which are 90 degrees out of phase with each other as described above. Such a function may be accomplished by having an analog output oscillator drive a plurality of digital gates which are oriented in phase quadrature.

The first path also includes an integrator 40 and a squarer 42. The output of the squarers 42, 42' of the first and second path 24, 26 respectively are input into a summer 44. The output of the summer 44 is applied to a threshold comparator 46 which compares the summation of the quantized output values (over a predetermined period) to a preset value. A suitable threshold comparator is produced by Integrated Devices Technology under the model number IDT-7381. During normal operation, if the quantized output value exceeds the preset value, then detection occurs.

The above structure functions well and is the accepted standard of correlation detectors in the industry. However, it does tend to consume a large amount of energy, especially when being operated at a high rate of speed. The present invention provides an economical alternative to the FIG. 1 correlation detector.

Figure 2:
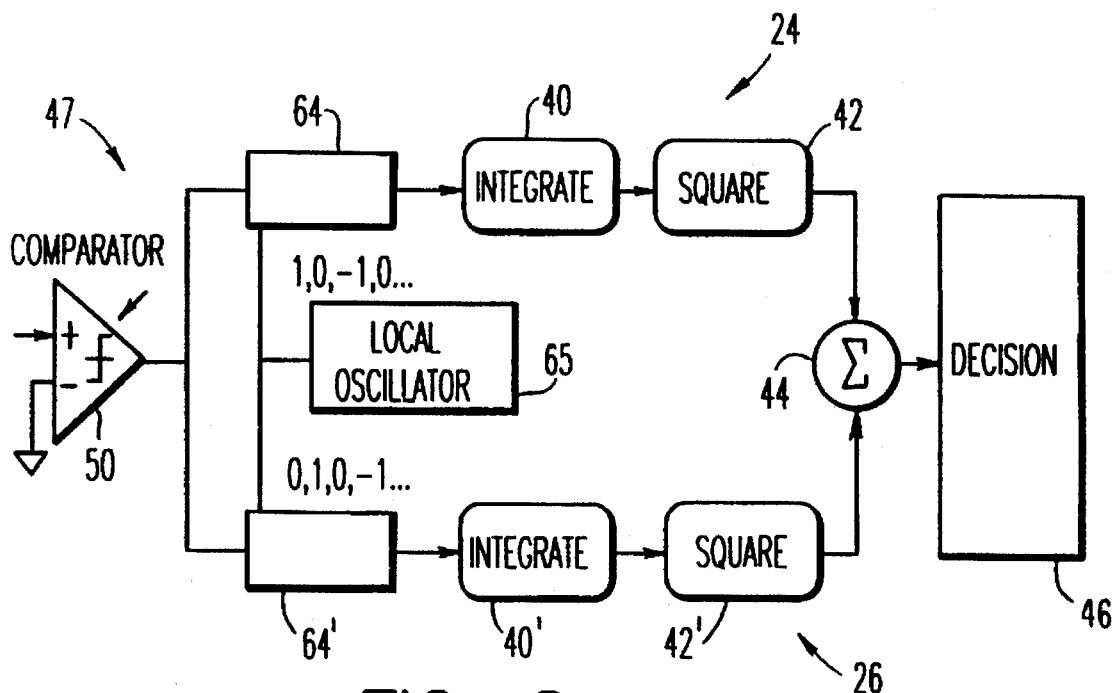
FIG. 2 is a block diagram of a correlation detector that is constructed and operated in accordance with one embodiment of the present invention.

FIG. 2 illustrates a block diagram of one-embodiment of a correlation detector 47 of the present invention. This diagram is similar to the FIG. 1 embodiment except that the A/D converter 20 has been replaced by a hard limiter/comparator 50 and the digital multipliers 30, 30' have been replaced by an arithmetic sign control 64, 64' of 1, −1, or zero. These two modifications are described separately in the following paragraphs.

A/D Conversion

Figure 4:
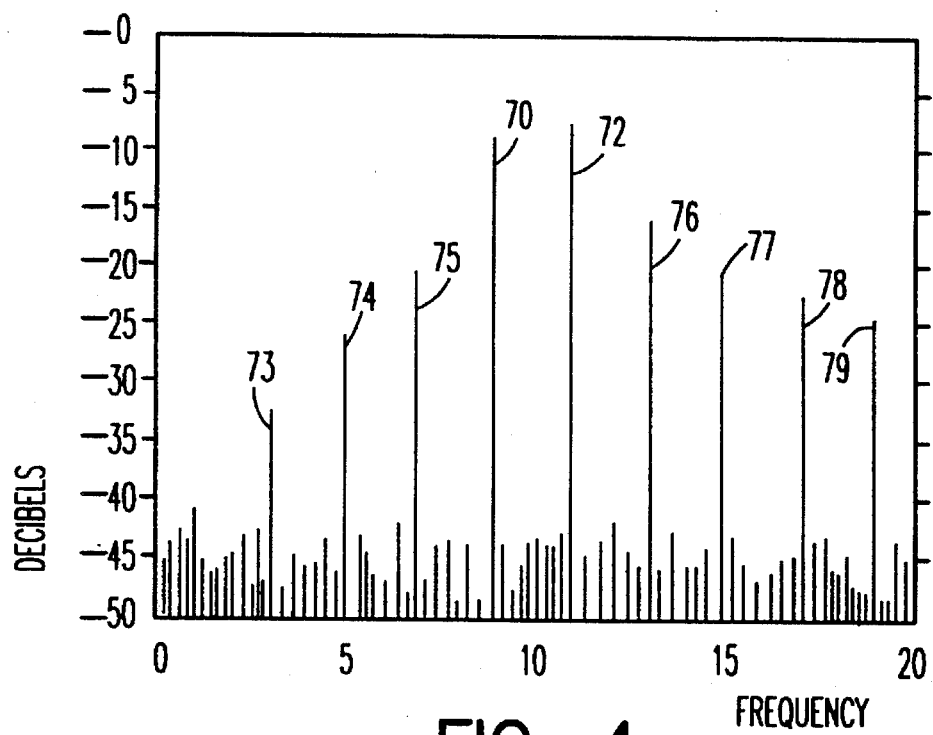
FIG. 4 is a graph that illustrates a Fourier spectrum of two sinusoids which are quantized to two amplitude levels.
Figure 5:
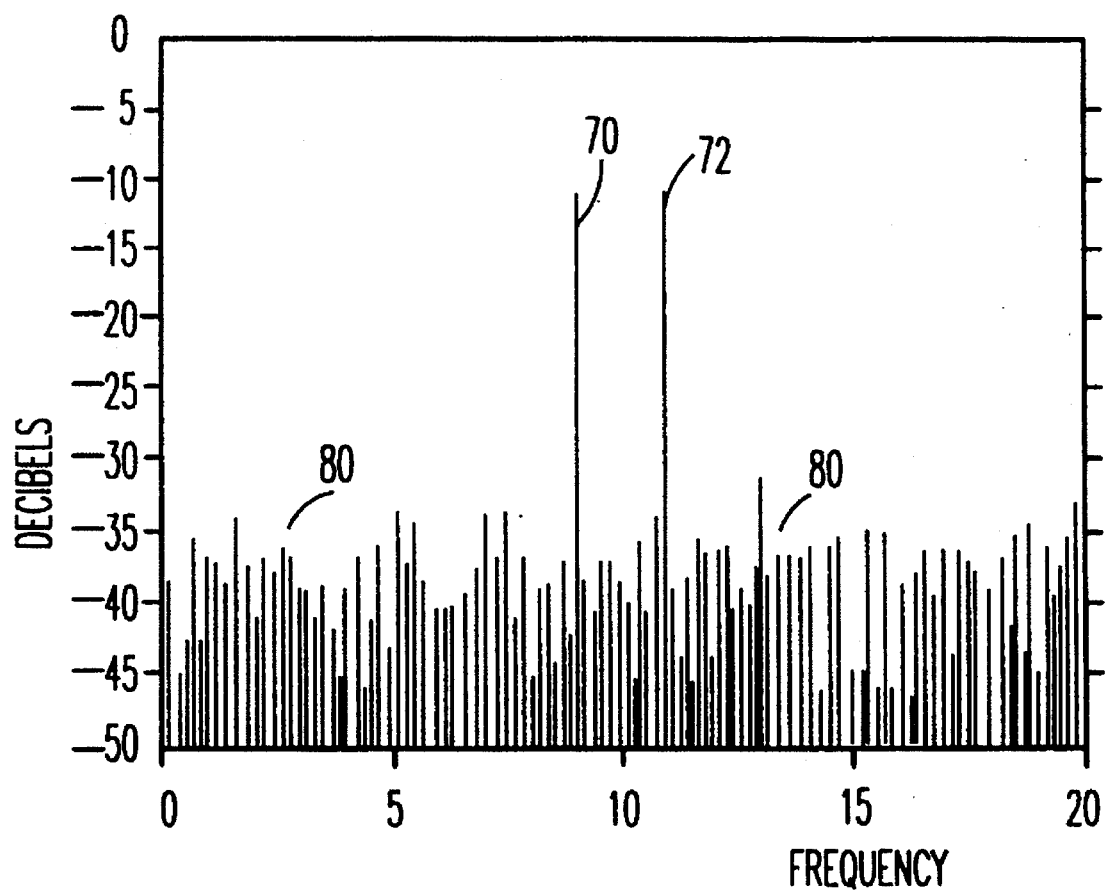
FIG. 5 is a graph that illustrates a Fourier spectrum of two noisy sinusoids which are quantized to two amplitude levels; and 6.

The A/D conversion operation in the FIG. 2 embodiment is provided by a hard limiter/comparator device 50. This device only encodes the polarity of the signal, and as such is effectively a two level A/D converter. Two level A/D conversion normally produces an excessive amount of intermodulation in the Fourier spectrum. The intermodulation products appear as fictitious signals which can produce false detections. However, when the signal-to-noise ratio (hereafter referred to as "SNR") is less than 1, then two level A/D conversion does not create intermodulation products capable of altering the output. This is illustrated in FIGS. 3–5.

Figure 3:
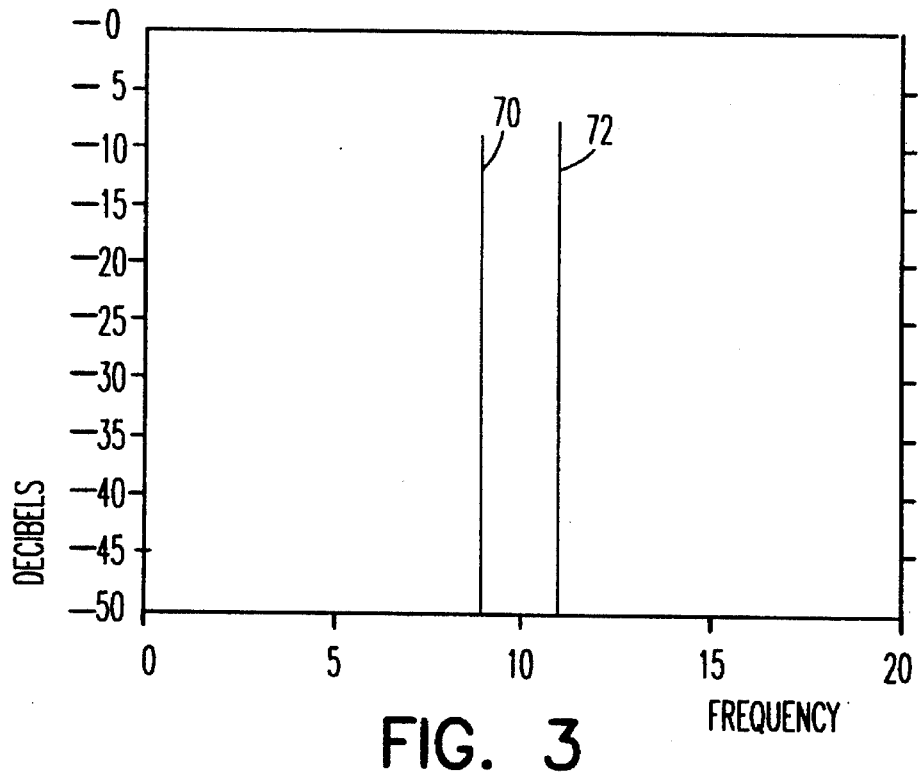
FIG. 3 is a graph that illustrates a Fourier spectrum of two sinusoids.

FIG. 3 depicts the Fourier spectrum of two ideal and quantized sinusoidal signals 70, 72. These sinusoids are then passed through a two level quantizer (related to the time domain). FIG. 4 depicts the Fourier spectrum of the quantized sinusoids; notice the numerous intermodulation products 73, 74, 75, 76, 77, 78, and 79, (which would potentially be capable of altering the outputs of the A/D converter) which are created from the quantization process. Noise was then added to the original two sinusoids prior to two level quantization; FIG. 5 depicts the resultant Fourier spectrum of the quantized noisy sinusoids. No intermodulation products exist in FIG. 5, since only the original signals 70, 72 (and no intermodulation products) are immersed in the white noise 80. In conclusion, intermodulation products are not created during two level A/D conversion if the SNR is less than one. This is the basis for eliminating the expensive multi-bit A/D converter in certain embodiments of the present invention.

Digital Multiplier Replacement

A second concept associated with certain embodiments of the present invention eliminates the expensive, power hungry, and computationally complex and slow digital multipliers 30, 30' by applying an arithmetic sign control value of +1, 0 or −1 to the discrete-time sampled data. This sign control value implicitly multiplies the quantized, sampled data by a cosine and sine wave at discrete points corresponding to ¼ of the sampling frequency. U.S. Pat. No. 4,038,540 performs multiplication by a two level exclusive NOR gate prior to sampling which may be considered as an example of a digital multiplier. This form of multiplication implicitly multiplies the quantized, unsampled data by quadrature square waves produced by the local oscillator 32 as described above.

The present invention functions by performing the function accomplished by the combined local oscillator 32, digital multipliers 30, 30' in the FIG. 1 embodiment by providing a local oscillator which alters between the values of −1, 0 and +1 to the arithmetic sign control devices 64, 64' (the values are input 90 degrees out of phase with each other as illustrated in FIG. 2). For example, if a string of input values from the local oscillator 65 which are being put into the arithmetic sign device 64 is 1, 0, −1, 0, 1, 0 −1, 0,... ; then the concurrent string of input values which are being put into the arithmetic sign device 64' is 0, 1, 0, −1, 0, 1, 0, −1, . . . If an input value of "1" is input into either of the arithmetic sign units 64, 64' from the local oscillator 65, then the arithmetic sign unit will output the same value to the integrator 40, 40' as was input from the comparator 50. If an input value of "−1" is input into either of the arithmetic sign units 64, 64' from the local oscillator 65, then the arithmetic sign unit will output an inverted value (the same magnitude) to the integrator 40, 40' as was input from the comparator 50. If an input value of "0" is input into either of the arithmetic sign units 64, 64' from the local oscillator 65, then the arithmetic sign unit will output a null signal (zero amplitude) to the integrator 40, 40'.

The multiplication method in the present invention yields a significant hardware benefit over the multiplication method in U.S. Pat. No. 4,038,540. The multiplication coefficients are +1, 0, −1. Notice that no actual multiplication needs to be performed for the 0 coefficient. This allows the data to be decimated by two allowing the subsequent circuit to clock at ½ the sampling frequency. This benefit saves power, cost, and processing time.

Figure 6A:
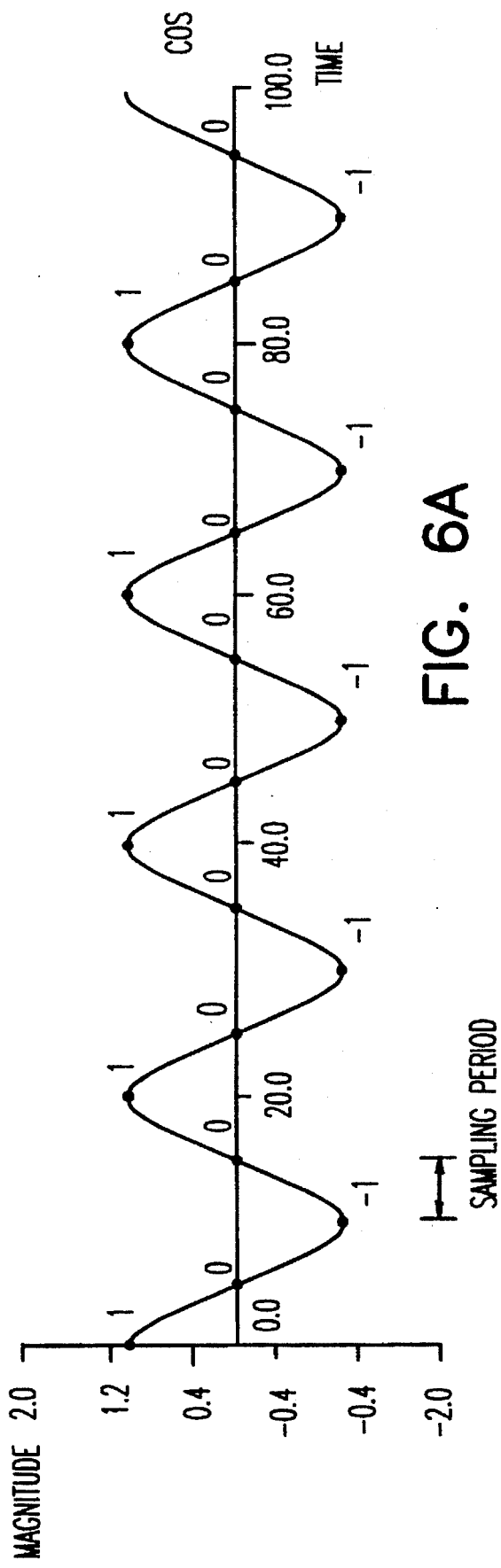
FIGS. 6a and 6b are graphs illustrating cosine and sine waves, respectively, and a relationship to +1, 0, −1 arithmetic signs at ¼ of a sampling frequency.
Figure 6B:
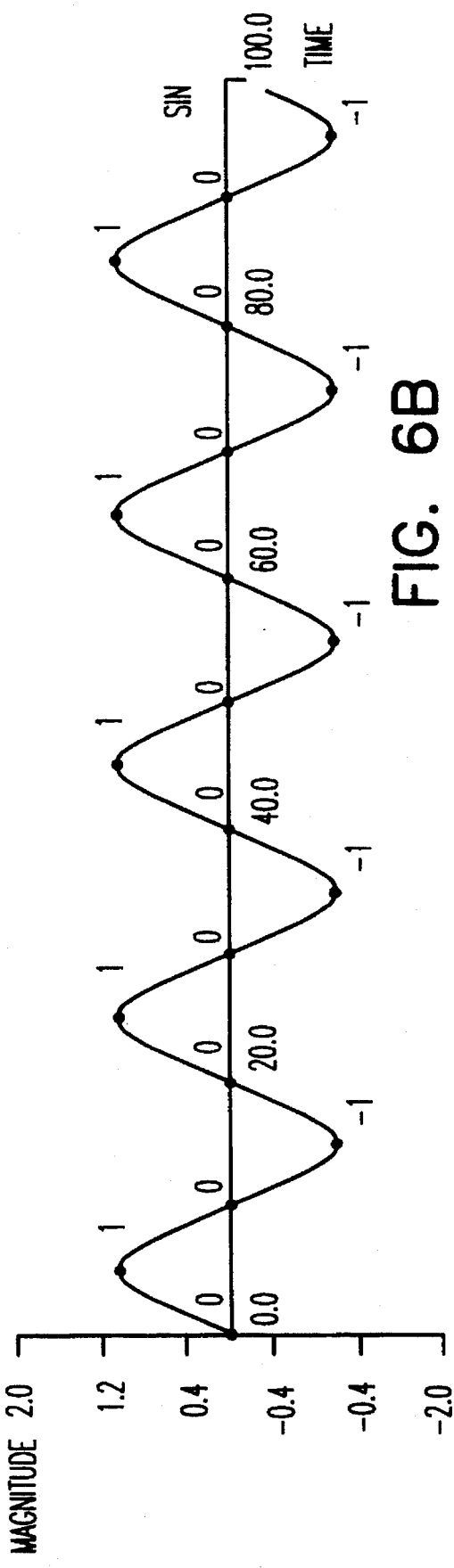

If the correlator is clocked at exactly four times the signal frequency at its maximum points, the complex reference signal (cosine and sine) reduce to the values of 1, −1, or zero. This is illustrated in FIGS. 6A and 6B. Therefore, by forcing the correlator clock to be exactly four times the signal frequency, the digital multiplier of FIG. 1 can be replaced by the relatively inexpensive and computationally simple arithmetic sign control 64 having values of +1, −1, or zero. In this case, absolutely no loss of multiplication fidelity is encountered. If the exact 4× relationship cannot be maintained, some loss of fidelity occurs depending upon the relative mismatch (which has not been specifically quantized at this time). However, in a system such as a radar, both the transmitted signal and detector clock can be phase locked to a master oscillator and the 4× relationship can easily be maintained.

Digital Integrators

Integration is performed by digital adders following the arithmetic sign control 64, 64' as is well known in the digital computing technologies. The integration could also be performed by digital up/down counters with appropriate decimation of the data so as not to count the zeroed data. If the integration time is set to a number of clock cycles that equals a power of two, the second harmonic generated from the multiplication process is completely suppressed (assuming that the 4× relationship exists). This desirable suppression is the result of the integrator's sin(x)/x transfer function nulls occurring at the signal frequency's second harmonic.

Conclusion

This invention provides two techniques to assist in achieving low cost correlation detector that exhibits performance similar to a conventional correlation detector that uses A/D converter and digital multipliers. This invention has two implementation constraints: (1) the input signal should have an SNR less than 1, which is usually the case; and (2) the circuit should be clocked at 4 times the signal frequency which can be accomplished by a phased locked system. If these two constraints cannot be met, the system continues to operate but its performance is somewhat degraded when compared to a conventional correlation detectors. The present invention produces results comparable to the prior art correlation detector with only a slight loss (−3.5 dB) of detection sensitivity. This loss of sensitivity is more than offset by the advantages of less hardware, lower power consumption and reduced costs.

While the invention has been particularly shown and described with respect to a preferred embodiment thereof, it will be understood by those skilled in the art that changes in form and details may be made therein without departing from the scope and spirit of the present invention.

What is claimed is:

1. A correlation detector, in which an analog sinusoidal input signal having an SNR less than 1 is applied, after digitizing into a digitized input signal, to a first path and a second path, each of which paths has an output and is provided with a correlated sinusoidal signal for combination with said digitized input signal to produce combined signals and has a portion for integrating and a portion for squaring said combined signals, and wherein the outputs of said first and second paths are summed in a summer portion having an output and a threshold comparator compares the output of said summer portion to a predetermined limit, which correlation detector comprises:

limiter/comparator means for digitizing said analog sinusoidal input signal by performing a two level A/D conversion on said analog sinusoidal input signal to produce a digitized two level input signal having a value of either +1 or −1 for application to said first and second paths;

means for producing a sine output and a cosine output, said sine output being in electrical communication with said first path, and said cosine output being in electrical communication with said second path, said sine and cosine outputs comprising said correlated sinusoidal signals and each having one of the values of −1, or 0, or +1; and a first arithmetic sign control device disposed in said first path before said portion for integrating, and a second arithmetic sign control device disposed in said second path before said portion for integrating, each of said first and second arithmetic sign control devices receiving respective inputs with one of the values of −1, or 0, or +1, from said means for producing a sine output and a cosine output, when acting to combine said digitized two level input signal respectively with said correlated sinusoidal signals, whereby said combined signals comprise an inverted value, or a null value, or the same value, respectively, as the value of said two level digitized input signal.

2. A correlation detector as in claim 1, wherein said means for producing a sine output and a cosine output comprises:

a local oscillator; and clock means for inputting a frequency to said local oscillator four times that of said local oscillator to produce the output values −1, 0, and +1.

3. A method of performing digital multiplication in a correlation detector, in which a sinusoidal input signal having an SNR less than 1 is applied, after digitizing into a digitized input signal, to a first path and a second path, each of which paths has an output and is provided with a correlated sinusoidal signal for combination with said digitized input signal to produce combined signals and has a portion for integrating and a portion for squaring said combined signals, and wherein the outputs of said first and second paths are summed in a summer portion having an output and a threshold comparator compares the output of said summer portion to a predetermined limit, comprising the steps of:

digitizing said sinusoidal input signal by performing a two level A/D conversion thereon to produce a digitized two level input signal having a value of either +1 or −1 for application to said first and second paths;

providing an arithmetic sign control portion in each of said first and second paths between said digitized two level input signal and said portion for integrating; and applying each of said correlated sinusoidal signals as outputs of a local oscillator respectively into said arithmetic sign control portions, each with one of the values of −1, or 0, or +1, when combining said digitized two level input signal with each of said correlated sinusoidal signals, whereby said combined signals comprise an inverted value, or a null value, or the same value, respectively, as the value of said digitized two level input signal.

4. A method as in claim 3, wherein a clocked input is provided to said local oscillator having a frequency four times that of said local oscillator to produce the output values −1, 0, and +1.

5. A correlation detector, having a first path and a second path, each of which paths is provided with a correlated sinusoidal signal for combination with a two level digitized input signal to produce a respective combined signal and has a portion for integrating and a portion for squaring said respective combined signal, comprising:

a hard limiter/comparator device which is configured to be operated with an S/N ratio of less than 1 for performing a two level A/D conversion on an analog sinusoidal signal input thereto, having an S/N ratio of less than 1, to provide said two level digitized input signal having values of either +1 or −1;

means for producing a sine output and a cosine output, said sine output being in electrical communication with said first path, and said cosine output being in electrical communication with said second path, said sine and cosine outputs comprising said correlated sinusoidal signals respectively provided to said first and second paths and each having one of the values of −1. or 0, or 1; and a first arithmetic sign control device disposed in said first path and a second arithmetic sign control device disposed in said second path, said first and second sign control devices being disposed between said hard limiter/comparator device and said respective portion for integrating and each having one of the values of −1, or 0, or +1 input thereto from said means for producing a sine output and a cosine output when combining said two level digitized input signal respectively with said correlated sinusoidal signals, whereby said combined signals comprise an inverted value, or a null value, or the same value, respectively, as the value of said two level digitized input signal.

6. A correlation detector as in claim 5, wherein said means for producing a sine output and a cosine output comprises:

a local oscillator; and clock means for inputting a frequency to said local oscillator four times that of said local oscillator to produce the output values −1, 0, and +1.

* * * * *